United States Patent [19]

Burmeister

[11] 4,444,613

[45] Apr. 24, 1984

[54] APPARATUS FOR PRODUCING TUBULAR PLASTIC SLEEVES FOR APPLICATION TO CONTAINERS

[75] Inventor: Robert J. Burmeister, Toledo, Ohio

[73] Assignee: Owens-Illinois, Inc., Toledo, Ohio

[21] Appl. No.: 378,564

[22] Filed: May 17, 1982

[51] Int. Cl.³ .............................................. B23K 3/02
[52] U.S. Cl. .................................... 156/446; 156/448; 156/456; 156/458; 156/583.1
[58] Field of Search ............... 156/456, 458, 447, 448, 156/446, 583.1, 583.4; 493/202, 197, 205, 209, 305, 306; 219/243

[56] References Cited

U.S. PATENT DOCUMENTS

| | | | |
|---|---|---|---|
| 2,762,420 | 9/1956 | Stanton | 156/583.1 X |
| 3,802,942 | 4/1974 | Amberg | 156/448 X |
| 4,238,665 | 12/1980 | Tremarco | 156/583.4 X |

*Primary Examiner*—David A. Simmons
*Attorney, Agent, or Firm*—Gerald T. Welch; Myron E. Click

[57] ABSTRACT

This disclosure relates to apparatus for forming tubular sleeves of heat-shrinkable cellular polymeric material from a predecorated web or roll. Predecorated body labels having precisely presized dimensions are formed from a web or roll on a turret type machine by serially winding rectangular thin sheet blanks of such material on cylindrical mandrels and overlapping the ends of each blank prior to seaming the same to make a presized tubular sleeve. The sleeve seam is formed by thermal fusion using an improved heated sealing bar which is heated during its retraction into contact with an improved annular metallic support ring having a series of internal cartridge type heaters therein. The ring is adapted to rapidly heat up and accurately control the heating of the sealing bars to a precise uniform temperature for improved sleeve making. The sleeves are then applied serially to either glass or plastic containers. The sleeves once formed are transferred axially onto the containers for subsequent thermoconstrictive heat-shrinking into final disposition on the container body portion.

1 Claim, 6 Drawing Figures

APPARATUS FOR PRODUCING TUBULAR PLASTIC SLEEVES FOR APPLICATION TO CONTAINERS

BACKGROUND OF THE INVENTION

1. Field of the Invention

This invention relates to the manufacture of composite containers and primarily to the manufacture of a hollow tubular plastic sleeve or label which is subsequently heat-shrunk onto the body portion of a hollow glass or plastic container. The sleeve is preferably formed from a continuous web or roll of heat-shrinkable oriented thermoplastic material immediately prior to its application to the container. Alternately, the sleeve may be preformed, flattened and stored, and later taken to a position adjacent the container where it is opened and moved into telescopic alignment with the container retained in upright relation. The final shrinking of the sleeve into tightly engaging condition around the container body is normally preformed by subjecting the sleeve to controlled hot air or infrared radiation heating during passage of the aligned surrounding sleeve and container through a tunnel oven.

2. Description of the Prior Art

This invention comprises an improvement over the methods and apparatus disclosed in issued U.S. Pat. Nos. 3,767,496 issued Oct. 23, 1974, 3,802,942 issued Apr. 9, 1974 and 3,959,065 issued May 25, 1976, all of which are commonly owned by the same assignee as the present application. In each of these disclosures a tubular sleeve is formed which is telecopically assembled onto the article from below by a push-up mechanism. All of these disclosures pertain to the thermal constriction of a thin tubular sleeve of thermoplastic material which is telescoped upwardly over the upright container during their coincidental alignment and retention of the sleeve in place for selective and controlled heating using infrared radiation for the thermoconstrictive process. U.S. Pat. No. 4,246,059, also owned by the common assignee of this application, discloses a method and apparatus for forming a tubular sleeve of shrinkable polymer material from a predecorated web for making tubular neck labels. The tubular sleeves are formed on apparatus which constituted an earlier form of sleeve making equipment. The present apparatus comprises a distinct improvement over such earlier equipment for making the sleeve with much faster start-up time and more uniform heat sealing of the heat-fusion type joint where the label material is overlapped on a forming mandrel. Previously the prior art required making the labels for containers from preprinted or predecorated rolls of prepared material which were cut to length into individual blanks for forming the presized sleeves. The cut blanks were precisely placed on a cylindrical forming mandrel and heat sealed into tubular form on the mandrel, using individual heated sealing bars which varied in temperature and sealing capability. The sleeves were then applied directly to the containers or flat folded into stored condition in a multipack for subsequent application to the containers. However, their fusion seams varied in strength and uniformity throughout their length due to sealing bar variations.

SUMMARY OF THE INVENTION

An object of this invention is to provide apparatus for forming heat-shrinkable tubular sleeves of thin thermplastic material which are applicable to mounting on either glass or plastic bottles, the sleeves normally being placed on such containers while both are conveyed in coaxial vertical alignment. The sleeves are preferably comprised of thin film or foam oriented thermoplastic material adapted to shrink primarily in a circumferential direction and to a lesser degree in a vertical direction. The containers preferably have right cylindrical body portions for mounting the sleeves thereon.

The present invention, as disclosed hereinafter in a specific preferred embodiment, provides apparatus for forming uniform preformed thin tubular bands or sleeves having an axial fusion weld which is formed by overlapping a portion of a rectangular blank on a cylindrical mandrel. A series of reciprocatable heated sealing bars is employed to form the axial seam by compressive force applied to the material backed by the mandrel to form a durable strong seam. The invention permits rapid heat up of the sealing bars to a uniform operating temperature by an annular metal ring which comprises a heat-sink against which the sealing bars are heated in their retracted nonsealing position. The annular ring contains a symmetrical series of apertures in its sidewalls in which are mounted a series of cartridge heaters connected in parallel to permit uniform heating of the sealing bars by an electrical energy source.

The method employs a rotary turret mechanism having a series of similar equi-spaced cylindrical mandrels mounted thereon, the mandrels being rotated to wrap the individual sleeve blanks thereon in overlapped relation.

DESCRIPTION OF PREFERRED EMBODIMENT

Figure 1:
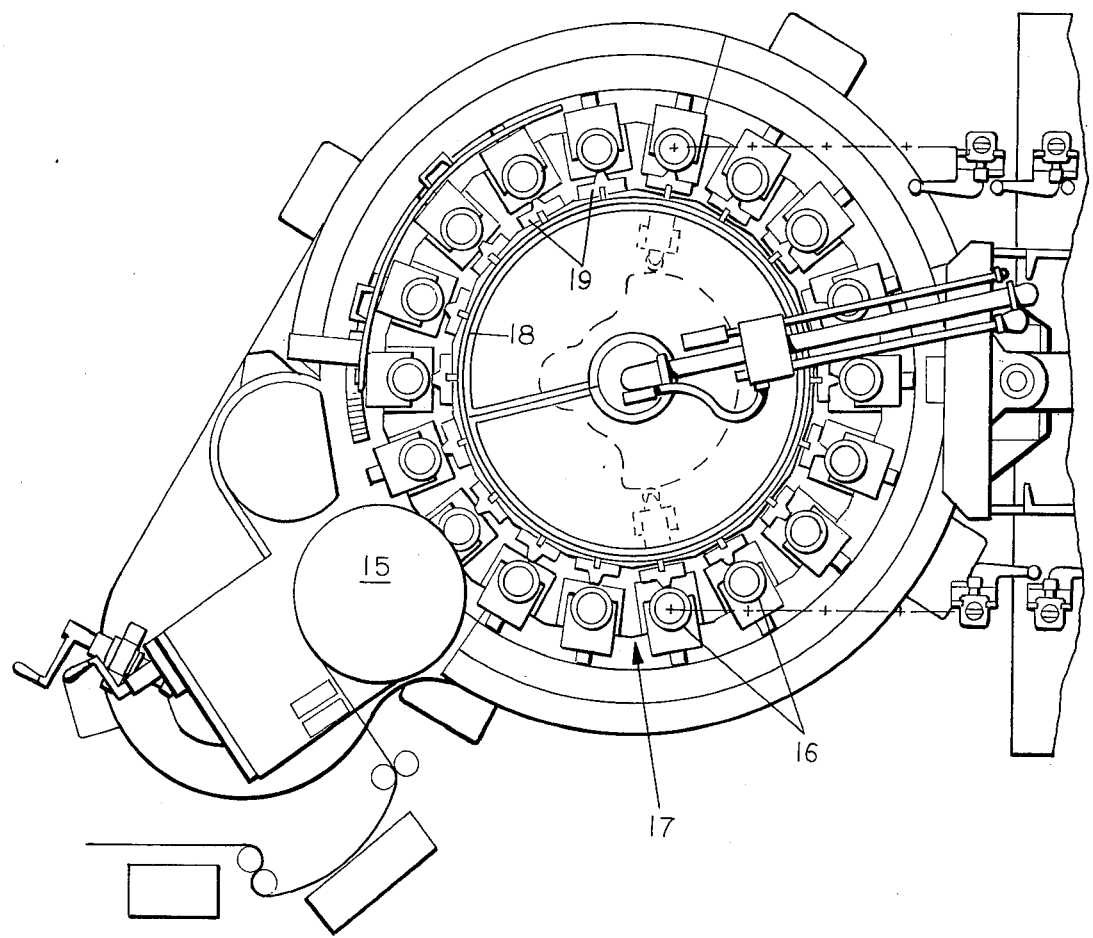
FIG. 1 is a top plan view of the machine for forming tubular sleeves in accordance with the present invention.

The apparatus for producing containers with plastic sleeves thereon, frequently consists of a rotary turret machine which is adapted to fabricating the tubular plastic sleeves immediately prior to their mounting on the containers. The predecorated heat-shrinkable plastic material preferably consists of a web or roll of foamed oriented polystyrene plastic, for example, having a thickness ranging from about 5 to 20 mils. The material may also consist of thin film polyvinyl chloride having a thickness ranging from 2 to 6 mils. The plastic web is delivered to the forming apparatus preferably in a roll mounted on a conventional supply reel. A multicolor printed pattern or decoration is commonly preprinted repeatedly over one surface of the supply web for providing predecorated labels. The printed pattern or decoration for a given label has a longitudinal pattern on the web which is lesser than the length dimension of the blank to be severed from the web. Frequently, spaced indicia are printed along the lengthwise dimension of the web to mark the blank cutting area. Each pattern or decorative copy is placed on the web between these indicia leaving blank end portions undecorated. The width of the web or blank is essentially equal to the height dimension of the label after it is shrunken on the container. The plastic material of the supply web is appreciably oriented or stretched in a longitudinal or machine dimension of the web. Only minimal or slight orientation exists in the cross or width dimension of the web which then constitutes the vertical dimension of the tubular sleeve.

The web or roll of thermoplastic material extends from a slitting device over a pulling roller which is driven, pulling the web through the slitting knife and roller. The pull roller is fastened on a vertical shaft mounted in suitable bearings located on opposite ends of the pull roller. The top is retained in a seat aperture in the top plate of the roller assembly. The top plate is spaced from the bottom plate by a series of hollow tube supports and bolts which extend through each of the supports to fasten the two plates together. The drive shaft of the pull roller is connected to a drive train element such as disclosed in U.S. Pat. No. 4,013,496 to S. W. Amberg issued Mar. 22, 1977, owned by the same common assignee as the present application, which patent disclosure is incorporated herein by reference. Also additional elements of the web roll pull roller are shown in U.S. Pat. No. 4,246,059 to C. F. Hadl issued Jan. 20, 1981, also owned by the same common assignee as the present application and incorporated herein by reference.

The mandrels are mounted in series in equi-spaced vertical alignment in a radial pattern on a rotary turret which is continuously rotated in a given direction. The sleeves are severed into individual rectangular blanks and each is tightly wrapped on an individual mandrel where their overlapped ends are joined by a fusion type axial seal. The forming of the blanks into presized sleeves on the rotating mandrels during the winding and sealing cycles is disclosed in various embodiments in the above-referenced patents. The mechanisms for rotating the mandrels during blank winding are disclosed in FIG. 15 of U.S. Pat. Nos. 3,883,388 and 3,914,152 both of which are commonly owned by the same common assignee as the present application.

After the tubular sleeves are fully formed having a diameter sightly greater than the container body portion and an axial length comparable to the container body height to be surrounded, they are ready to be mounted on the container bodies whether the containers be either plastic or glass bottles or jars. The sleeves are preferably formed from predecorated blanks immediately prior to their application to the individual containers. The feed drum for the web material is positively rotated in a position tangential to the machine turret. A cutter roll is also mounted in tangential relation to the feed drum to permit severance of the blanks from the roll stock. The stock is held in the feed drum by vacuum so that the blanks may be severed by a cutter element contacting and being forced through the sheet at equi-spaced intervals. The feed drum is preferably hard-surfaced and the cutter element is brought into close proximity therewith during the cutting operation. The cutter roll has one or more cutter elements thereon to sever the desired uniform length blanks of thermoplastic materials, the feed roll controls the rate of delivery of the web stock to the feed drum on which the uniform blanks are severed.

As shown in FIG. 1 the blanks are fed off the feed drum 15 onto individual cylindrical mandrels 16 mounted in series on the rotary turret 17 of the machine. The mandrels are right-cylindrical in shape having a length slightly greater than the blanks width. The mandrels are mounted in vertical equi-spaced radial relation around the periphery of the machine turret. Each mandrel is rotated during its interval of wrapping the blank thereon upon its delivery from the feed drum. Each mandrel has an axially extending series of apertures (not shown) which are connected to a vacuum line to retain the leading edge of the blank thereon during wrapping. The mandrels each have precisely-similar diameters and axial dimensions so that when the blanks are individually wrapped therearound, the ends of the blank are overlapped to a slight extent to permit their being sealed at undecorated areas to form a sleeve having tubular form.

As the leading edge of the blank is fed to an individual mandrel, it is forcibly engaged by the lineal series of vacuum apertures and the blank is tightly wrapped around the smooth cylindrical surfaces of the mandrel. Apparatus for wrapping the blank on the mandrel as aforesaid is known in the art and does not constitute a major part of this invention. Several arcuately-shaped spaced-apart horizontal guide rails arranged in stacked relation with respect to the mandrels are located around one portion of the turret to assist the blank into firm contact with an individual mandrel. The blanks once wrapped on the mandrels are then ready to be axially seamed by the subject apparatus.

Figures 2, 6:
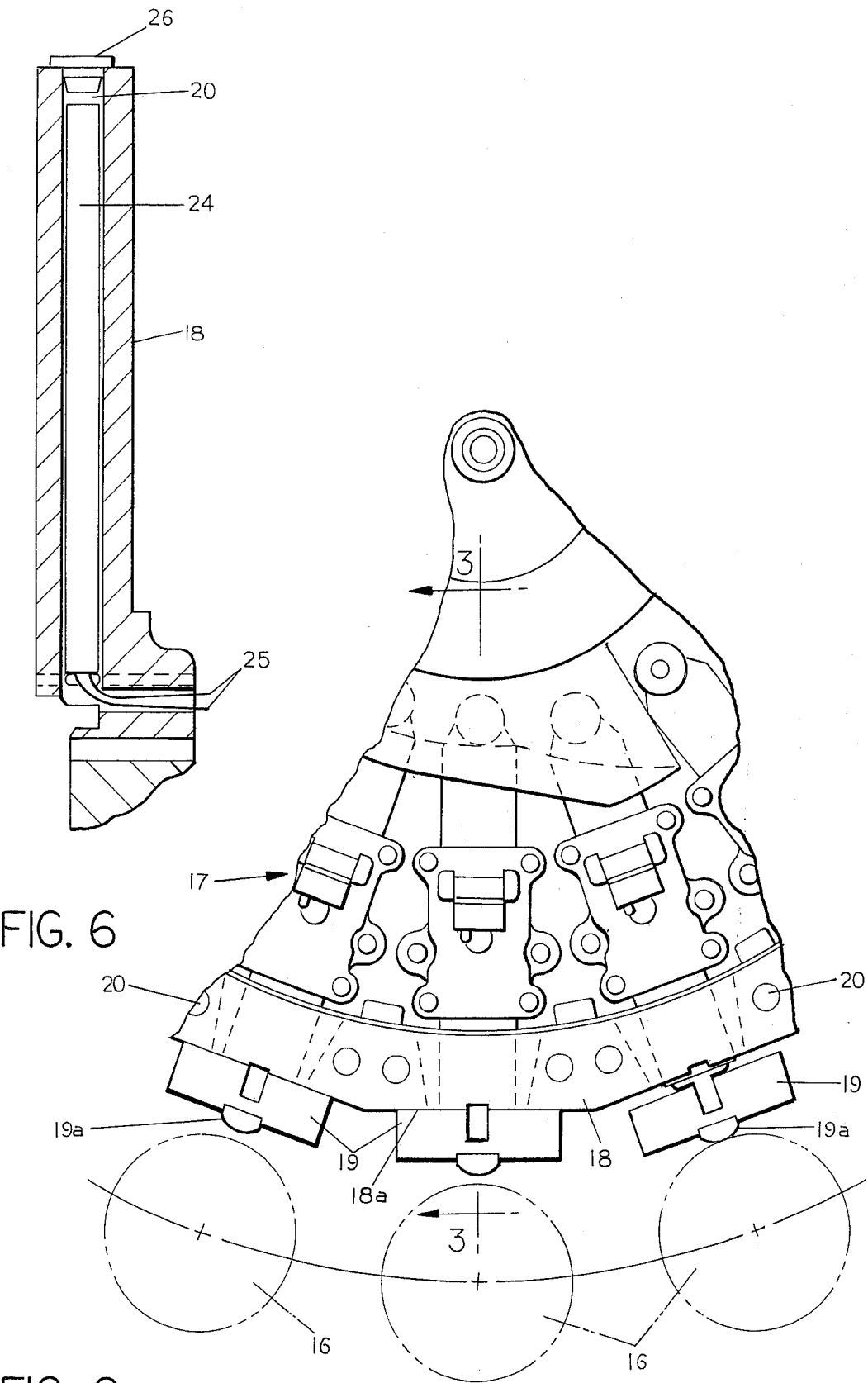
FIG. 2 is an enlarged fragmentary top plan view of one portion of the machine shown in Fig. 1.
FIG. 6 is an enlarged vertical sectional view of one portion of the ring member taken along the line 6—6 of FIG. 4.
Figure 4:
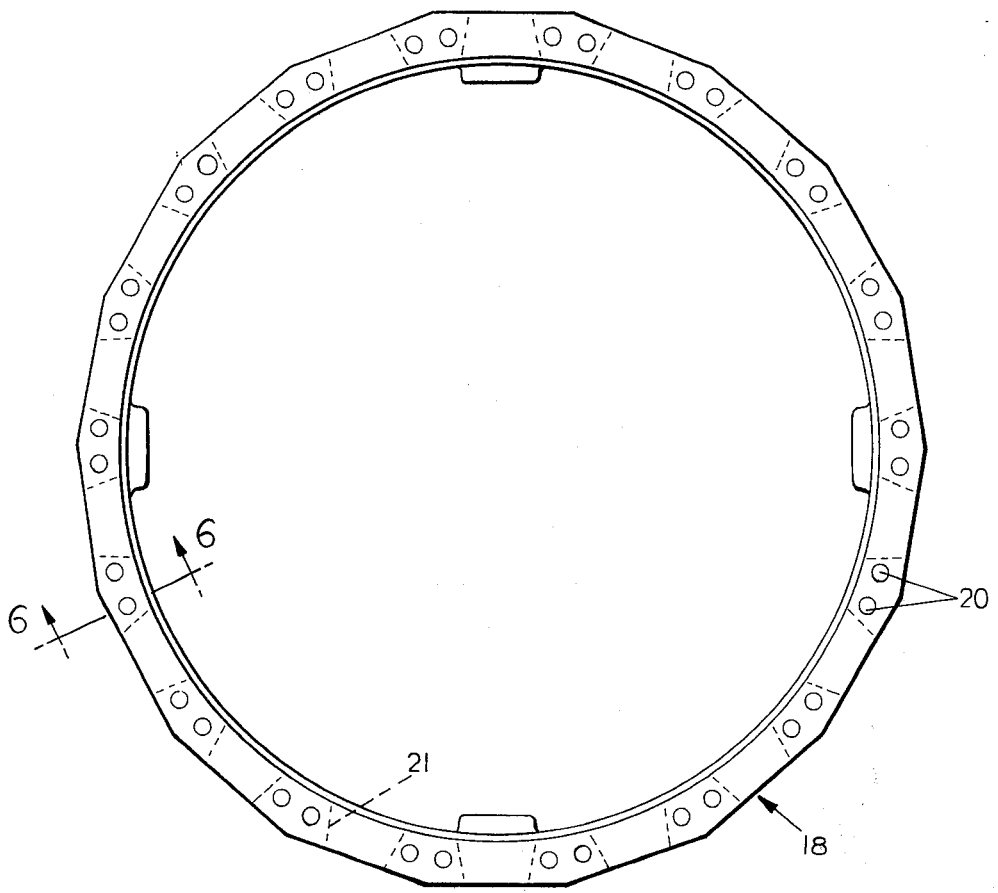
FIG. 4 is a reduced top plan view of entire heat-sinking ring member of the machine shown in FIGS. 2 and 3.
Figure 5:
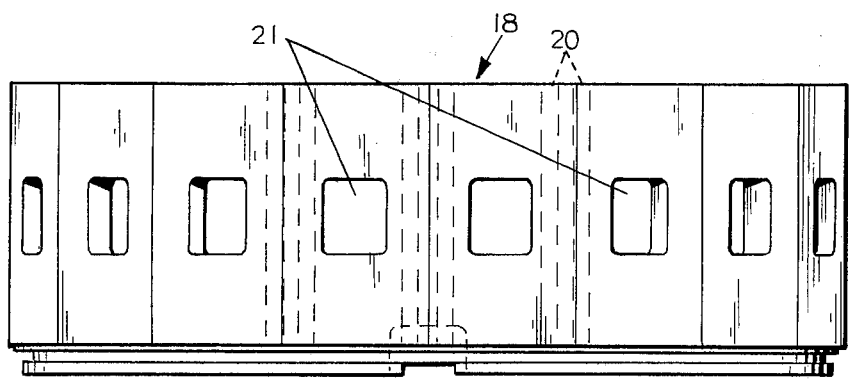
FIG. 5 is a side elevational view of the ring member shown in FIG. 4.

The rotary turret of the machine has a unique annular ring 18 mounted interiorly of the mandrels which bear a spaced-apart radial series of heat-sealing bars 19. The annular ring 18 comprises a modified heat sink comprised of an aluminum ring with a series of equal dimensioned flattened surfaces facing exteriorly. As shown in FIG. 2 each of the sealing bars 19 faces an individual mandrel 16 on which the sheet blank is wrapped. The annular ring 18 has a series of transversely extending apertures 20 therein arranged in symetrical relation around its entire periphery, the apertures extending essentially throughout the vertical height of the ring. The ring is shown in its entirety in FIG. 4 with a pair of transverse apertures 20 disposed adjacent a heat-sealing bar 19 which extends through an aperture in its sidewall.

Figure 3:
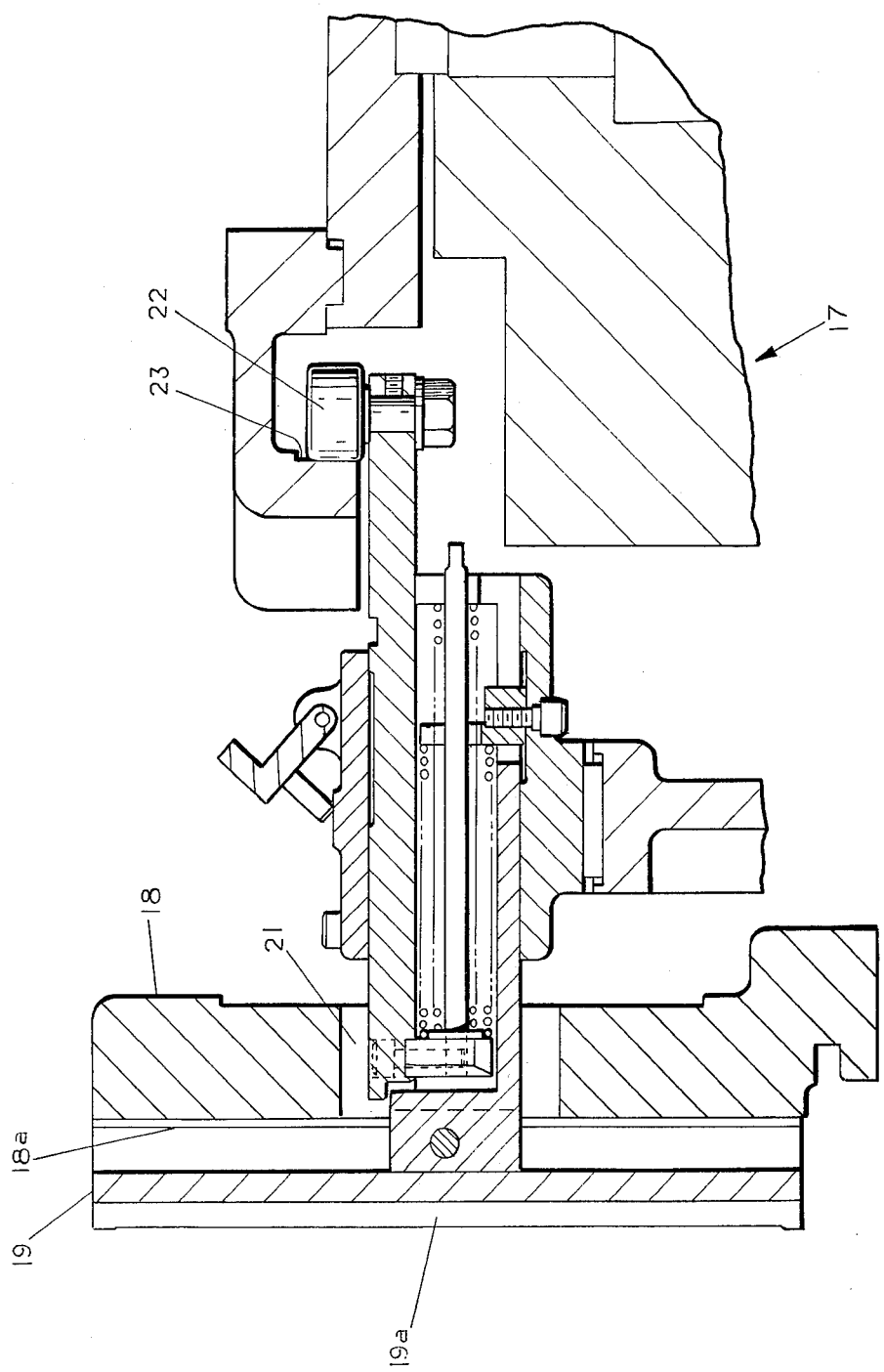
FIG. 3 is a partial vertical sectional view of one portion of the machine taken along line 3—3 of FIG. 2.

The sealing bar 19 as shown in FIG. 3 extends through the aperture 21 in the annular ring and is reciprocable horizontally by a cam 22 which follows an interior cam track 23. Each sealing bar 19 has an curvilinear operating face in the form of a cylindrical segment 19a which is adapted to forcefully contact the overlap portion of the blank for sealing the same by fusion heating. The exterior surface of annular ring 18 has a coating 18a of electroless nickel thereover to facilitate surface to surface thermal contact between the ring and sealing bar 19.

Each aperture 20 has a cartridge-type heating element mounted therein, as shown in FIG. 6 which serves to heat ring 18 to a uniform operating temperature. Electrical leads 25 extend to each of the cartridge heaters for providing electrical power to the cartridge heater for its operation. A plug 26 is employed to close the upper end of each aperture 20 as also shown in FIG. 6. FIG. 2 shows, on the left hand side, sealing bar 19 in thermal contact with a flattened surface of annular ring 18 and, on the right hand side, the sealing bar is in extended heat sealing position with its cylindrical sealing surface contacting the overlapped blank.

The heat-sink ring is used to provide heat for the sealing bars of the sleeve labeling machine by improved thermalconduction. The ring provides increased heat-sink temperature capabilities and stability for the sleeve sealing operation.

A thermocouple is mounted on an arm which rides on the inside surface of the ring to detect the ring temperature. The thermocouple is the sweep contact type with direct feed back control. The ring is maintained within a temperature range of from 350° to 550° F. depending upon the sleeve material and thickness being employed. The heated ring permits lower heat loss and shorter warm-up time for the machine and also less machine down-time is required to maintain and replace defective heating elements. By improving the heating of the sealing bars closely associated mechanical parts are maintained at lower operating temperatures thus preserving lubrication of moving parts. In a typical operation the sealing bars are maintained at a temperature of about 400° F. to obtain improved sealing of the sleeves. A nine inch cartridge heater, Watlow Model No. L8NX30A or a thirteen-inch cartridge heater Watlow Model No. L12AX3933 can be used depending upon ring height and sealing bar length. Both heaters are made and sold by Watlow Company, St. Louis, Mo.

Thus, it has been found that start-up time of the machine has been reduced by as much as 60 to 70% leading to significantly increased production. The cartridge heating elements may be replaced readily by working on the turret from exposed surfaces. The cartridge type heaters may be connected in a variety of circuitry modes either in a parallel arrangement or with certain segments of the ring periphery connected to a single circuit.

Various modifications can be resorted to within the spirit and scope of the appended claims.

What is claimed is:

1. In apparatus of the rotary turret type for forming tubular sleeves of heat-shrinkable thermoplastic material on a series of equi-spaced rotary, cylindrical mandrels mounted at circumferentially spaced intervals on said turret with an annular heated metal ring mounted interiorly of said mandrels and wherein reciprocated heat sealing bars corresponding in number to the number of mandrels are mounted on said turret with actuating means connected thereto extending through openings in said metal ring, said heat sealing bars being held in physical engagement with said ring to be conductively heated thereby when retracted out of sealing engagement with sleeves on the mandrels, the improvement in said annular metal ring comprising a plurality of spaced-apart vertical apertures extending through said ring adjacent the exterior face thereof, an electrical cartridge heater mounted in each said aperture and extending substantially the full height thereof, a source of electrical power connected to said heaters, and wherein said annular metal ring comprises an aluminum alloy having a coating of electro-less nickel over at least its exteriorly-facing surfaces to form a heat sink for surface-to-surface conductive heating of said sealing bars.

* * * * *